US010154295B2

(12) United States Patent
Gibbon et al.

(10) Patent No.: US 10,154,295 B2
(45) Date of Patent: *Dec. 11, 2018

(54) METHOD AND SYSTEM FOR ANALYSIS OF SENSORY INFORMATION TO ESTIMATE AUDIENCE REACTION

(71) Applicant: AT&T Intellectual Property I, L.P., Atlanta, GA (US)

(72) Inventors: David Crawford Gibbon, Lincroft, NJ (US); Raghuraman Gopalan, Freehold, NJ (US); Bernard S. Renger, New Providence, NJ (US); Behzad Shahraray, Holmdel, NJ (US); Eric Zavesky, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/810,189

(22) Filed: Nov. 13, 2017

(65) Prior Publication Data

US 2018/0115794 A1 Apr. 26, 2018

Related U.S. Application Data

(63) Continuation of application No. 14/822,937, filed on Aug. 11, 2015, now Pat. No. 9,854,288, which is a (Continued)

(51) Int. Cl.
*H04N 21/258* (2011.01)
*H04H 60/33* (2008.01)
(Continued)

(52) U.S. Cl.
CPC ....... *H04N 21/25891* (2013.01); *G06Q 30/02* (2013.01); *H04H 60/33* (2013.01);
(Continued)

(58) Field of Classification Search
None
See application file for complete search history.

(56) References Cited

U.S. PATENT DOCUMENTS 6,530,082 B1 3/2003 Del Sesto
7,237,250 B2 6/2007 Kanojia
(Continued)

OTHER PUBLICATIONS

International Search Report and Written Opinion dated Feb. 5, 2015 in PCT/US2014/067017 filed Nov. 24, 2014, 13 pgs.
(Continued)

*Primary Examiner* — Jason K Lin
(74) *Attorney, Agent, or Firm* — Guntin & Gust, PLC; Robert Gingher

(57) ABSTRACT

A system that incorporates the subject disclosure may perform operations, for example, including determining a first correlation value between a behavior of a first audience member and a subject matter being presented at a display processor, wherein the subject matter being presented at the display is observable by the first audience member. A second correlation value is determined between the behavior of the first audience member and a characteristic of an environment in a vicinity of the display and the first audience member. Responsive to the second correlation value exceeding the first correlation value, a determination is made as to whether a present channel selection resulting from user input initiated by the first audience member is responsive to the characteristic of the environment influencing the audience member more than the subject matter being presented at the display. Other embodiments are disclosed.

20 Claims, 6 Drawing Sheets

Related U.S. Application Data continuation of application No. 14/089,905, filed on Nov. 26, 2013, now Pat. No. 9,137,558.

(51) Int. Cl.

| | | |
|---|---|---|
| *G06Q 30/02* | (2012.01) | |
| *H04H 60/43* | (2008.01) | |
| *H04N 21/438* | (2011.01) | |
| *H04N 21/25* | (2011.01) | |
| *H04N 21/466* | (2011.01) | |
| *H04N 21/45* | (2011.01) | |
| *H04N 21/422* | (2011.01) | |
| *H04N 21/4223* | (2011.01) | |
| *H04N 21/262* | (2011.01) | |
| *H04N 21/81* | (2011.01) | |
| *H04N 21/442* | (2011.01) | |
| *H04H 60/45* | (2008.01) | |
| *H04N 21/254* | (2011.01) | |
| *H04N 21/658* | (2011.01) | |

(52) U.S. Cl.
CPC ............ *H04H 60/43* (2013.01); *H04H 60/45* (2013.01); *H04N 21/252* (2013.01); *H04N 21/25883* (2013.01); *H04N 21/26291* (2013.01); *H04N 21/4223* (2013.01); *H04N 21/42201* (2013.01); *H04N 21/42202* (2013.01); *H04N 21/42203* (2013.01); *H04N 21/4383* (2013.01); *H04N 21/44218* (2013.01); *H04N 21/44222* (2013.01); *H04N 21/4532* (2013.01); *H04N 21/4661* (2013.01); *H04N 21/812* (2013.01); *H04N 21/254* (2013.01); *H04N 21/25866* (2013.01); *H04N 21/6582* (2013.01)

(56) References Cited

U.S. PATENT DOCUMENTS

| | | |
|---|---|---|
| 7,370,073 B2 | 5/2008 | Yen et al. |
| 7,760,740 B2 | 7/2010 | Broberg |
| 7,916,631 B2 | 3/2011 | Kamentsky et al. |
| 7,930,762 B1 | 4/2011 | Blair et al. |
| 8,250,614 B1 | 8/2012 | Ellis et al. |
| 8,255,949 B1 | 8/2012 | Bayer et al. |
| 8,365,212 B1 | 1/2013 | Orlowski |
| 8,387,093 B2 | 2/2013 | Danker et al. |
| 8,429,683 B2 | 4/2013 | Dasgupta |
| 8,438,591 B2 | 5/2013 | Smith et al. |
| 8,484,511 B2 | 7/2013 | Tidwell et al. |
| 8,516,515 B2 | 8/2013 | Zigmond et al. |
| 8,769,557 B1* | 7/2014 | Terrazas ............ H04N 21/44218 725/12 |
| 2002/0069404 A1 | 6/2002 | Copeman et al. |
| 2002/0069407 A1 | 6/2002 | Fagnani et al. |
| 2003/0033600 A1 | 2/2003 | Cliff et al. |
| 2003/0037333 A1 | 2/2003 | Ghashghai et al. |
| 2007/0271518 A1 | 11/2007 | Tischer et al. |
| 2008/0216107 A1 | 9/2008 | Downey et al. |
| 2009/0133051 A1 | 5/2009 | Hildreth |
| 2009/0187939 A1 | 7/2009 | Lajoie |
| 2010/0043021 A1 | 2/2010 | Torsiello et al. |
| 2010/0110079 A1 | 5/2010 | Kirkendall-Rodriguez et al. |
| 2010/0211439 A1 | 8/2010 | Marci et al. |
| 2011/0016482 A1 | 1/2011 | Tidwell et al. |
| 2011/0110515 A1 | 5/2011 | Tidwell et al. |
| 2011/0164188 A1 | 7/2011 | Karaoguz et al. |
| 2011/0206342 A1* | 8/2011 | Thompson ............. H04N 5/782 386/200 |
| 2011/0243536 A1 | 10/2011 | Eyer |
| 2011/0289524 A1 | 11/2011 | Toner et al. |
| 2012/0124606 A1 | 5/2012 | Tidwell et al. |
| 2012/0224043 A1 | 9/2012 | Tsurumi et al. |
| 2013/0205311 A1 | 8/2013 | Ramaswamy et al. |
| 2013/0219417 A1* | 8/2013 | Gilson ................. H04N 21/258 725/12 |
| 2014/0023338 A1 | 1/2014 | Won et al. |
| 2014/0108309 A1 | 4/2014 | Frank et al. |
| 2014/0201766 A1 | 7/2014 | Stepanov et al. |
| 2014/0250447 A1 | 9/2014 | Schink et al. |
| 2014/0331242 A1 | 11/2014 | De La Garza et al. |

OTHER PUBLICATIONS

PCT/US14/067017 International Preliminary Report on Patentability dated Jun. 9, 2016.

PCT/US14/067017 International Search Report & Written Opinion dated Jun. 9, 2016.

Li, Yuheng et al., "Characterizing user access behaviors in mobile TV system." Communications (ICC), 2012 IEEE International Conference on. IEEE, 2012. http://dx.doi.org/10.1109/ICC.2012.6363915.

Li, Yuheng et al., "Measurement and analysis of a large scale commercial mobile internet tv system." Proceedings of the 2011 ACM IGCOMM conference on Internet measurement conference. ACM, 2011. http://www.cs.columbia.edu/~lierranli/coms6998-11Fall2012/papers/mobiletv_imc20.

\* cited by examiner

METHOD AND SYSTEM FOR ANALYSIS OF SENSORY INFORMATION TO ESTIMATE AUDIENCE REACTION

CROSS-REFERENCE TO RELATED APPLICATION(S)

This application is a continuation of and claims priority to U.S. patent application Ser. No. 14/822,937, filed Aug. 11, 2015, which is a continuation of and claims priority to U.S. patent application Ser. No. 14/089,905, filed Nov. 26, 2013 (now U.S. Pat. No. 9,137,558). All sections of the aforementioned application(s) are incorporated by reference herein in their entirety.

FIELD OF THE DISCLOSURE

The subject disclosure relates to a method and system for analysis of sensory information to estimate audience reaction.

BACKGROUND

In broadcast networks, such as cable television networks, content or programming may be provided from a variety of sources, such as programming networks, local affiliates, and so forth. In the case of cable television networks, the content is made available to users or subscribers via network operators such as Multiple System Operators (MSOs). Some channels may be ad-supported and other channels (e.g., premium channels) may be supported at least in part by additional fees paid by subscribers. In the case of ad-supported channels (and even premium channels), various forms of advertising may be employed including conventional advertisements temporally interleaved with programming segments and product placement advertisements. For example, the programming may be interrupted by a commercial break, divided into a number of ad spots. Advertisers pay to place advertisements into each of these spots. In the case of product placement advertisements, advertisers may pay to have their products or services appear, or be referenced, during programming.

In cable television networks, advertisements are usually statically interspersed within a given broadcasted program. In this manner, every media processor in a local service area which is currently tuned to the same program channel receives the same advertisements at approximately the same time and in the same order. Advertisement time is typically priced based upon an associated program's popularity (and hence its time slot). Such prices are commonly based on a rating service, such as the Nielsen Television Ratings, which are ratings determined by measuring of the number of unique viewers or households tuned to a television program at any one particular time.

The Nielsen rating system can provide ratings based on program content and advertising. Nielsen television ratings are gathered in one of two ways. One method involves asking viewers of various demographics to keep a written record of the television shows they watch throughout the day and evening. Other methods involve using meters, which are small devices connected to televisions in selected homes. These devices electronically gather the viewing habits of the home and transmit the information to Nielsen over a connected phone line.

BRIEF DESCRIPTION OF THE DRAWINGS

Reference will now be made to the accompanying drawings, which are not necessarily drawn to scale, and wherein.

DETAILED DESCRIPTION

Figure 1:
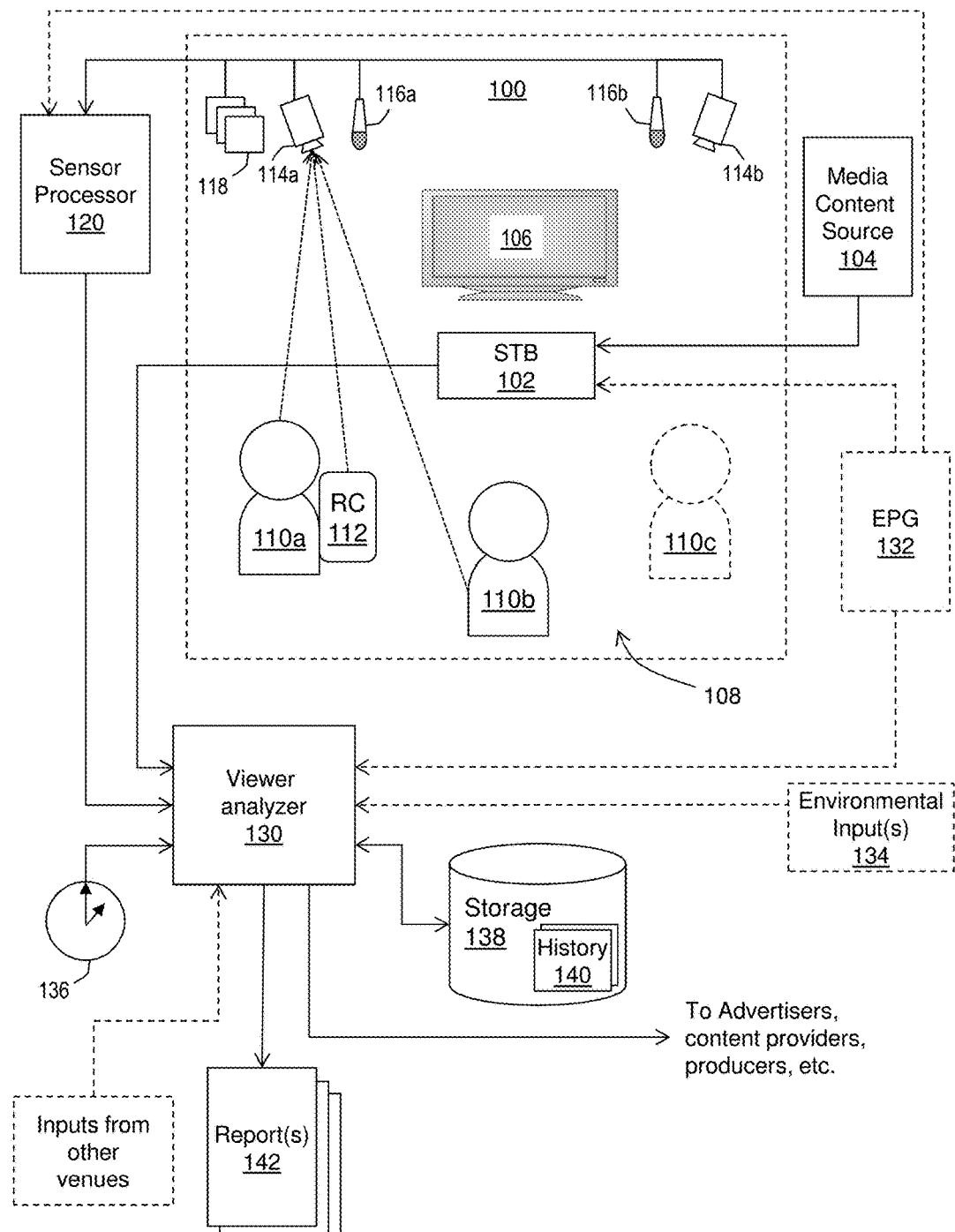
FIG. 1 depicts a schematic diagram of an illustrative embodiment of a system for evaluating usage of a media processor and estimating audience reaction.

The subject disclosure describes, among other things, illustrative embodiments of automated analysis of sensory information related to an audience to estimate audience reaction according to tuning status, such as remaining fixed tuned to a presentation of a media item or tune away events during which the audience tunes from presentation of one media content item to presentation of another media content item. The sensory information can include information obtained during presentation of the media content item. The information can be related to one or more audience members and/or an environment within which the media content item is being presented. Other embodiments are included in the subject disclosure.

One embodiment of the subject disclosure is a method that includes identifying, by a system including a processor, a presentation of a first media item at a display. The display is communicatively coupled to a media processor that is tuned to the presentation of the first media item. Sensing data obtained from an environment in a vicinity of the display is received by the system and a behavior of a first audience member proximate to the display is determined from the sensing data. The first media item presented at the display is observable by the first audience member. A characteristic of the environment is determined from the sensing data, and a tuning status is monitored. The tuning status includes a fixed tune by which the media processor remains tuned to the presentation of the first media item, or a tune away by which the media processor is tuned from the presentation of the first media item to a second media item. The second media item, when presented at the display, is observable by the first audience member. A first correlation value is determined between the behavior of the first audience member and subject matter being presented in the first media item. Likewise, a second correlation value is determined between the behavior of the first audience member and the characteristic of the environment in the vicinity of the first audience member. A determination can be made, responsive to the second correlation value exceeding the first correlation value that the environment and not the subject matter being presented in the first media item is responsible for the tuning status.

Another embodiment of the subject disclosure includes a system having a processor and a memory that stores executable instructions. The instructions, when executed by the processor, facilitate performance of operations that include identifying a presentation of a first media item at a display communicatively coupled to a media processor tuned to the presentation of the first media item. The operations also include receiving sensing data obtained from an environment in a vicinity of the display and determining from the sensing data a characteristic of a first audience member proximate to the display. The first media item presented at the display is observable by the first audience member. A characteristic of the environment is determined from the sensing data and a tuning status is monitored. The tuning status includes a fixed tune by which the media processor remains tuned to the presentation of the first media item, or a tune away by which the media processor is tuned from the presentation of the first media item to a second media item. The second media item, when presented at the display, is observable by the first audience member. A first correlation value is determined between the characteristic of the first audience member and subject matter being presented in the first media item. Likewise, a second correlation value is determined between the characteristic of the first audience member and the characteristic of the environment. Responsive to the first correlation value exceeding the second correlation value, a determination can be made that the subject matter being presented in the first media item and not the environment is responsible for the tuning status.

Yet another embodiment of the subject disclosure includes a machine-readable storage medium, having executable instructions that, when executed by a processor, facilitate performance of operations. The operations include identifying a presentation of a first media item at a display communicatively coupled to a media processor tuned to the presentation of the first media item, and determining from sensing data a characteristic of a first audience member proximate to the display. The first media item presented at the display is observable by the first audience member. The operations also include determining from the sensing data a characteristic of an environment in a vicinity of the first audience member, and detecting a tuning status. The tuning status includes a fixed tune by which the media processor remains tuned to the presentation of the first media item, or a tune away by which the media processor is tuned from the presentation of the first media item to a second media item. The second media item, when presented at the display, is observable by the first audience member. A first correlation value is determined between the characteristic of the first audience member and subject matter being presented in the first media item. Likewise, a second correlation value is determined between the characteristic of the first audience member and the characteristic of the environment. A determination is made that the environment and not the subject matter being presented in the first media item is responsible for the tuning status, responsive to the second correlation value exceeding the first correlation value.

FIG. 1 depicts a schematic diagram of an illustrative embodiment of a system 100 for evaluating audience reaction to presentation of media content items. The system 100 includes a media processor, such as a set-top box 102 and/or a digital video recorder (not shown). The set-top box 102 is coupled to a media content source 104 (e.g., a content server or other network elements of a service provider) and to a display device 106. In the illustrative embodiment, the set-top box 102 and the display device 106 are situated within a venue, such as a home media room 108 although other venues that enable an audience to view media can be utilized in system 100. It is understood that a home can have more than one media room, such as determined by placement of other display devices 106. The set-top box 102 receives media content items from the media content source 104, processes the media content items and presents the processed media content items at the display device 106. One or more viewers or audience members 110a, 110b, 110c (generally 110) present within the media room 108 are proximate to the display device 106. The proximity of the one or more audience members 110 to the display device 106 can be at a distance, angle, and so forth, which enables the audience members to be exposed (visually and/or audibly) to the media content displayed on the display device 106.

The system 100 can include a remote control device 112 for controlling operation of one or more of the set-top box 102, the display device 106, and other devices, such as an audio system, lighting and/or climate controls for controlling an environment of the media room 108. Alternatively or in addition, one or more other user interfaces can be used for affecting such controls. Examples of other user interfaces can include front-panel controls, e.g., of the set-top box 102 and/or the display device 106, light switches, thermostats and other controls that might be provided on ancillary equipment within the environment of the media room 108.

In the illustrative example, the remote control device 112 can be used to select a first media content item, e.g., choose a first channel to access broadcast content presented thereon and/or selecting a menu item to access a video-on-demand item. Other examples of a remote control device 112 may include a personal mobile device, a voice-controlled device, or a gesture-enabled component of the display 106 or set-top box 102 embodiments. Once selected, the first media content item is displayed on the display device 106. At any instant, one of the audience members 110 may choose to switch to another media content item. For example, a first audience member 110a in possession of the remote control device 112 may choose to remain tuned to the first channel, or to tune from the first channel to a second channel to access alternative broadcast content and/or select another menu item to access a second video-on-demand content item, and/or to change from one of a broadcast content or video-on-demand content to the other. Such events are generally referred to herein as tune away events, or simply "tune aways."

The system 100 also includes one or more sensors to obtain sensory information related to the environment. In this example the environment is the area that is in the vicinity of the display device 106. The size or configuration of the area of the environment can vary, such as depending on the venue in which the media is being viewed. For instance in one embodiment, the environment can be limited to inside of a media room where the media room is a closed, sound-insulated room. In other embodiments, the environment can be both inside and outside of a room that includes the display device 106, such as where the display device is in an open living room and other areas (e.g., the kitchen, dining room, bedrooms) can be seen or sounds from these other areas can be heard from the open living room. Other examples of environments can include an outside environment, where the audience is watching the display device 106 in the outdoors.

The sensory information being obtained can be related to one or more of the audience members 110, the local environment of the media room 108 and a larger environment. As an example, a location sensor, such as a GPS sensor, can be utilized to determine a location that can be associated with an address and/or a region (such as a city and/or state), and sensory information from weather sensors, news feeds and the like can be obtained, such as based on the location information. In the illustrative example, the sensors include one or more cameras 114a, 114b (generally 114), microphones 116a, 116b (generally 116), and/or other sensors 118, such as thermal sensors, motion sensors, location sensors, accelerometers, biometric sensors.

Any of the sensors 114, 116, 118 can be unitary items, e.g., a single camera 114a or single microphone 116a. Any of the sensors 114, 116, 118 can be an array of multiple like sensors 114, 116, 118. Combinations of unitary items and arrays of sensors can also be utilized. In the illustrative example, the system 100 includes two cameras 114a, 114b and two microphones 116a, 116b within the same media room 108. The cameras 114 and microphones are positioned at different locations, e.g., on opposite sides of the display device 106. Such an arrangement of multiple sensors can be used to cover a larger area than any one individual sensor is capable of, and/or to provide some degree of isolation or localization of sensed activity. In one or more embodiments, sensory data from multiple sensors can be used to localize or otherwise determine a position of a source of a particular stimulus.

In one embodiment, a vocalization by a first audience member 110a can be captured by both microphones 116a, 116b. An analysis of audio sensory information obtained from both microphones 116, e.g., according to one or more of amplitude, phase and time delay, can be used to identify or otherwise estimate which audience member 110 is associated with the vocalization. In the illustrative example, an audio signal from the first audience member 110a to the left of center of the display device 106 might be detected first at the left microphone 116a, and subsequently at the right microphone 116b, the delay being due to propagation delay of the sound waves. An evaluation of the time delay according to time difference of arrival can be used to identify an angle with respect to a baseline joining the two microphones 116. The audio sensory data, including the analysis results of the angle, can be compared with visual sensory information from one or more of the cameras 114, e.g., to correlate the determined angle with an individual audience member 110 captured by the camera(s) 114.

The system 100 can include a sensor processor 120 coupled to one or more of the sensors 114, 116, 118. The sensor processor 120 can perform pre-processing of sensor data, e.g., performing formatting of the data, data conversion and/or some level of analysis. For instance, the sensor processor 120 can be configured to receive sensor information from individual sensors, such as the individual microphones 116, to determine a direction of detected audio. The sensor processor 120 can also be configured to analyze sensor information from more than one type of sensor, e.g., the microphones 116 and the cameras 114, to associate sensor information, such as sound with one or more of the audience members 110 and the environment. In the illustrative example, the sensor processor 120 can be configured to identify a particular audience member 110a detected by the camera(s) 114 as the source of a particular vocalization detected by the microphones 116.

In some embodiments, one or more of the sensors 114, 116, 118 can be integrated into one or more of the set-top box 102 or the display device 106. Alternatively or in addition, sensor processing can be accomplished by the set-top box 102, e.g., configured with software, such as an application software module, to analyze and/or interpret sensor data from one or more of the sensors 114, 116, 118.

The system also includes a viewer analyzer 130. The viewer analyzer 130 is in communication with one or more of the sensor processor 120 and/or the sensors 114, 116, 118, receiving information obtained by the sensors 114, 116, 118, including processed information obtained from the sensors, e.g., from the sensor processor 120. The viewer analyzer 130 is also in communication with the set-top box 102, e.g., receiving tuning information related to a tuning setting and changes to a tuning setting of the set-top box 102. In some embodiments, the analyzer 130 receives information from the set-top box indicating an identity of the media content item being presented at the display device 106.

The viewer analyzer 130 can receive inputs from one or more other sources, such as an electronic program guide 132, and/or other environmental inputs 134. Examples of other environmental inputs 134 can include news items, e.g., from one or more news feeds. The news items can be national, regional, and/or local, or some combination of various news feeds. Other examples of environmental inputs include weather related inputs, emergency messages, e.g., from the Emergency Broadcast System, and/or inputs from other home systems, such as a home alarm system, and/or a communication system, such as a telephone system and/or a data system (e.g., a broadband network connection to the Internet). Note that the concepts disclosed here also apply to cases where the broadcast content is adapted for particular viewers or particular sets of views, e.g., local or targeted ad insertion.

As disclosed more fully below, the viewer analyzer 130 can be programmed or otherwise configured to evaluate one or more input values from one or more of the various input sources to monitor tuning status, such as remaining tuned or a tune away event, e.g., a channel change, and to determine or otherwise estimate whether the tuning status was the result of the media content displayed at the time of the monitoring, or from some other environmental factor.

In one or more embodiments, records indicating viewership of programmed content provided by a media content source 104 can be intrinsically valuable as measures of media consumption. Media service providers might use such information to evaluate channel selections and packaging in order to increase profitability by providing popular content and/or bundling popular content with other content to leverage exposure, e.g., to new and/or alternative programming. Examples include introduction of a new program series at a time slot on the same channel immediately subsequent to a demonstrated popular program. An indication as to whether viewers remain tuned to the new program series can be used as a measure of value and/or success of the particular program lineup.

Media producers might also use viewership information including information indicating that viewers are remaining fixed tuned or tuning away from presentation of particular media content, to evaluate a particular plot in a drama series, jokes in a comedy, exciting scenes in a thriller, and so forth. Feedback indicating that viewers tuned away from a program at a particular time can be correlated to the subject matter of the media content at the time of the tune away. Further evaluation can be performed, e.g., aggregating results from multiple viewers, drawing attention to program segments at which viewers tuned away. It is conceivable that the renewal or cancellation of a particular program and/or series might depend upon, or otherwise be influenced by, such viewer results.

Viewers might choose to remain tuned or to tune away from a program as a direct result of the subject matter being presented. Examples for tuning away might include sensitive material of a violent or otherwise mature nature not suitable for children. Upon detecting the presence of any objectionable content, the viewer can tune away to an alternative channel to avoid exposure of younger viewers to unsuitable content. Other examples include viewer boredom with a particular show, annoyance with a particular commercial, or desire to watch more preferable content. Thus, a one-hour program may be viewed for the first half hour, but tuned away when a more desirable program airs in the next half-hour slot. Knowledge of tune aways for these and other content related reasons can be valuable to service providers, content providers and/or advertisers, and the exemplary embodiments can identify tune aways that are content related.

Viewers also tune away for a myriad of other reasons, not all resulting from dissatisfaction or relative preference regarding subject matter of a particular media content item. Some examples of reasons why a viewer might tune away include a change in a viewing audience at a particular location. Consider a first viewer watching a program alone. When joined by a second viewer, the first and second viewers might agree to tune away to a different program, perhaps a special program that the second viewer is intent on viewing. This is not necessarily a tune away for any reason related to dissatisfaction with the first program. Indeed, if the second viewer never entered, the first viewer may have remained tuned to the first media item.

In another example, a viewer may be watching one program, but tuning away, e.g., periodically, to observe or otherwise obtain an update regarding another program. The other program might be a sporting event, which the viewer tunes to periodically for updates on a score or developments of the event. In such instances, a historical assessment of the viewer's tune aways would indicate the viewer tuned away, but later returned to the main program. With knowledge of the tuned-to event, e.g., the sporting event in the illustrative example, a reason for the tune away may be all the more apparent. Still further examples of tune away events can result from other environmental factors, such as weather warning, a phone call, a visit, changes to the audience members for whom the content may not be appropriate, or some other factor.

Sensory data from one or more sensors, such the camera(s) 114, can be evaluated to determine if an audience member has left the room. For example, video and/or still images capturing the audience members can be processed to distinguish among members of the audience, e.g., by identifying faces, with or without facial recognition. A change in the number and/or make-up of the faces present can be compared to earlier results. In some embodiments, determination that one or more audience members have left the room, without a tuna away, could be interpreted as a tune away event.

In determining whether such departures of audience members constitute tune aways, subsequent evaluations of the sensor data can be used to determine whether the audience member may have returned relatively quickly, e.g., after a trip to the kitchen or bathroom. Such momentary departures followed by returns can be used to discount or otherwise negate an otherwise determined tune away event or "vote" for a tune away event. The sensory information can be obtained from one or more different sensors to discount or otherwise determine that departure of an audience member was not a tune away. For example the microphones hear the toilet flushing in the background, supporting a conclusion about a reason the person left the room momentarily. Such conclusions that are distinguishable from the media content can be identified and ascertained from sensory data.

Without understanding or otherwise evaluating a reason for tune away events, it is possible that any tune away could be interpreted as a vote of dissatisfaction with the programmed and/or advertising content. When such tune away events do not result from dissatisfaction with a particular program, they can be considered or otherwise referred to as "false positive" results. Namely, they falsely indicate dissatisfaction, but they are not the result of any such dissatisfaction. Reports provided to service providers, content providers and/or advertisers can contain an aggregate of tune-away events for a number of households. The numbers can be aggregated as appropriate, e.g., according to a local market, a regional market, a national market, demographics, and so forth. The techniques disclosed herein, however, provide insight as to a cause for the tune away. Such insight might simply be an indication whether a particular tune away is the result of the media content or some other environmental factor indicative of a false positive. Such aggregated results can be provided illuminating the possibility of false positives to provide more complete insight into viewer behavior as it relates to media content.

The viewer analyzer 130 can be configured to analyze sensory information from one or more of the sensor processor and/or the sensors 114, 116, 118 to evaluate reactions from audience members 110 and to evaluate environmental factors. As discussed more fully herein, the viewer analyzer 130 can be configured to evaluate reactions of the audience members 110 and environmental factors, to monitor a tuning status, and to determine, infer or otherwise estimate whether the tune away event relates to subject matter of media content presented at the display device 106 or to some other reason, e.g., related to an environmental factor.

In an illustrative example, the viewer analyzer 130 receives an input from one of the set-top box 102, the remote control 112, or a combination thereof indicating a particular tuning of the set-top box 102. The viewer analyzer 130 determines a time reference, e.g., from an internal time source, an external time source, such as a dedicated time source 136, e.g., network time source, or from another system component, such as the set-top box 102. The viewer analyzer 130 can determine media content presented at the display according to a tuning of the set-top box 102, a time and a program listing, e.g., by way of the electronic program guide 132. In some instances, a viewing location input is necessary in order to resolve time zone ambiguity, e.g., Eastern Time, Central Time. In at least some instances the time source 136 includes a time of day value and a calendar value, e.g., indicating one or more of a day of the week and a calendar day, and perhaps year.

The viewer analyzer 130 continues to monitor for tune away events. Monitoring of tuning status can be event driven, e.g., according to a change in tuning status, e.g., a tune event, being detected from one of the set-top box 102 or the remote controller 112. Alternatively or in addition, the viewer analyzer 130 can continuously or periodically monitor a tuning status of the set-top box 102 to determine a current tuning. A comparison of a current tuning can be compared to a prior tuning result to determine whether the tuning status corresponds to remaining fixed tuned when there is no change between current and prior tuning results. Likewise, a tune away can be determined by a difference between the current and prior tuning results. The viewer analyzer 130 can record the tune away, e.g., by noting a first channel and a time of the tune away event. Other information can be recorded, such as a media content item or program being aired on the first channel at the time of the tune away, and perhaps a description of a scene, and/or whether commercial message was displayed at the time of the tune away. Such records can be preserved, e.g., stored in an electronically accessible storage 138 as personal history records 140 for a particular household and/or particular audience member(s) of the household.

In some embodiments, sensory information from the microphone(s) 116 can be processed, e.g., using speech recognition to determine additional audio context. The audio processing, e.g., speech recognition, can be applied to one or more of the media content and/or the dialog of members of the audience to determine a context of what is occurring within the viewing area. In some embodiments, a direct audio input, e.g., from the set-top box 102 can be processed by the viewer analyzer 130 in conjunction with the microphone audio, e.g., to remove, distinguish or otherwise identify audio from the media content with respect to audio from the environment including the audience members. This would allow for distinguishing and discounting dialog from a program that might support a tune away event, e.g., an actor stating "change the channel."

In a dialog scenario, the audience members may be discussing potentially tuning away before a tune away event occurs. Alternatively or in addition, the audio of the media content may contain references to something that is something the audience members talk about before the tune away event. Also, the additional information gained from speech recognition increases the value of the tune away event since it can be used to further to convert an otherwise false positive to a true positive. Such refinement of results would tend to increase its value, e.g., to advertisers.

The viewer analyzer 130 continues to monitor other sensory inputs, e.g., indicative of environmental factors. In some embodiments, the viewer analyzer 130 maintains a record of the sensory data in a "raw format," e.g., recording of events, such as sounds related to conversations, changes to audience members 110, identification of which audience member has the remote controller 112, changes in possession of the remote controller 112, news and/or weather events, warnings, etc. In some embodiments, the viewer analyzer 130 processes the sensory information to determine more sophisticated representation of the environment. Examples of further processing can include interpreting dialog among audience members, e.g., to determine a subject matter of the dialog as it might related to any tune away events. Such interpreted dialog can be interpreted according to certain keywords, such as requests to change a channel or otherwise tune to a program on another channel. Such keywords can include keywords related to channel change, and keywords derived from alternative sources, such as the electronic program guide 132. In some embodiments, dialog is detected, but not interpreted. Dialog can be detected and distinguished from other vocalizations, such as cheering, laughing, quarreling, etc. Such non-descript analysis can be determined, e.g., according to one or more of a volume or cadence of the vocalizations.

The viewer analyzer 130 can evaluate visual sensory information, e.g., from the camera(s) 114 to determine audience members. The viewer analyzer 130 can apply one or more of various degrees of image processing of the imagery information. For example, the viewer analyzer 130 can detect features, such as faces and/or individuals to determine a number of audience members. A more sophisticated analysis can be performed, e.g., using imaging analysis to identify features that would otherwise allow for determining one or more of audience members age, gender, familial status, identity. Such information can be used to determine or otherwise estimate demographics of the audience. Features can also be used to recognize or otherwise identify members of the audience. For example, facial features can be used to recognize particular members of a family that regularly view programming at the display device 106. Unrecognized features can indicate that someone other than a family member, e.g., a visitor, is present. It is conceivable that frequent visitors can be recognized upon subsequent viewing. Such recognition can be used to attribute activity to historical profile of particular users.

In at least some embodiments, even more sophisticated analyses can be performed, e.g., to determine or otherwise estimate or infer an emotional state of one or more of the audience members. Emotional states can indicate if audience members are sleepy, bored, engaged excited, humored, agitated, quarrelsome, etc. Sensory inputs from more than one different types of sensors, e.g., camera(s) 114 and microphone(s) 116 can be combined, e.g., to remove ambiguity or otherwise support a more reliable characterization of the environment. An example might include indications of agitation of the audience, e.g., with numerous hand and/or body gestures surrounding a channel change. Sound, including vocalizations, can be used to determine or otherwise estimate a nature of the gestures, e.g., a quarrel, or laughter. In one or more embodiments, sensory information captured for a particular audience member can be used to confirm viewer analysis, such as determining a state of agitation based on frequent movements of an audience member detected from captured images and then confirming the state of agitation based on audio captured which is analyzed via speech recognition to detect negative commentary or which is identified as non-word sounds from the audience member indicative of agitation (e.g., grunts, shrieks, and so forth).

To the extent that any such non-contextual dialog, contextual dialog, demographic and/or emotional information is derived or otherwise obtained from the sensors 114, 116, 118, the information can be used to evaluate tune away events. The environmental record can be maintained in an instantaneous manner, such that a snapshot is provided at the time of a tune away, capturing a state of the environmental sensors at that time. Alternatively or in addition, a historical record of the sensor information can be developed over time and referenced or otherwise associated with any tune away events. Reference to such historical sensory record can be determined according to a particular time reference, e.g., within some number of seconds and/or minutes of a tune away. Thus, environmental information, e.g., of the audience members, can be inspected for some number of seconds of minutes, with a supporting characterization of the audience state during the sample time window. Such sensory information, including evaluations of audience states, can be averaged over time, analyzed to identify extremes, e.g., relative maxima or minima, or any other suitable statistical variation of such data. In one or more embodiments, historical sensory data for an audience member can be stored and can be utilized in a subsequent viewer analysis of that audience member, such as a comparison of previous movements and/or sounds of the audience member being compared with present movements and/or sounds of that audience member. In one or more embodiments, this comparison can be performed in conjunction with an analysis of the previous subject matter at the time of the previous movements and/or sounds as compared with the subject matter at the time of the present movements and/or sounds.

In some embodiments, viewership patterns can be determined. The more regularly a particular program is viewed can indicate a significant preference for the particular program by a family or family member. Combining audience member identification, e.g., visually, audibly, by self-reporting (logging in) and so forth, with one historical viewing results, and in at least some instances the EPG, viewing patterns emerge. It is possible that the same audience member(s) appear for certain recurring shows/series, like a weekly show such as "Amazing Race." If a tune away event occurred during such a show, that would raise some suspicion. Perhaps, the viewer was channel surfing during commercials or the show was delayed by a previous football game that went over so that would explain why the viewer is not intently watching the weekly show. Thus, the weight of such a tune away might be discounted.

A strength of preference can be further identified by comparing regularly viewed programs in context with other programming. For example, if a viewer remains tuned to the regular program while the President addresses the nation during a state of the union, that can be used to establish a measure of affinity for that program with respect to the other program. If the viewer happens to miss the regular program for another event, such as a sporting playoff, that too can be used to establish a relative measure of affinity for the program to yet another program. Such affinities can be reported along with tuning status results to support analyses of tuning status.

In some embodiments, the viewer analyzer 130 receives inputs related to tune away events at one or more other venues. For example, the viewer analyzer 130 can be maintained at a central location, such as a central office and/or a network head end. In this embodiment, the viewer analyzer 130 can be an aggregating analyzer which can receive tune away results including any and all of the various information sources disclosed herein. Continuing with this example, the aggregating analyzer 130 can further analyze the aggregated information, e.g., to provide a summary. Such summaries can be prepared in an ongoing manner, or by request, e.g., a subscription based service. The summaries can include results of a statistical evaluation, e.g., indicating averages, means, modes, variances, distributions and so forth. It is also understood that results can be stored, e.g., in the electronically accessible storage 138 for historical analysis based on individual viewers, viewing regions, or any suitable aggregation of results, e.g., according to particular programs, genres, actors, producers, time slots, days of the week, seasons, etc. Alternatively or in addition one or more reports 142 of tune aways can be prepared and disseminated according to subscription or in the normal course of reporting. Alternatively or in addition, results, either raw sensory information or analytical results, individual or in the aggregate, can be provided to others, such as service providers, content providers, and advertisers.

Figure 2:
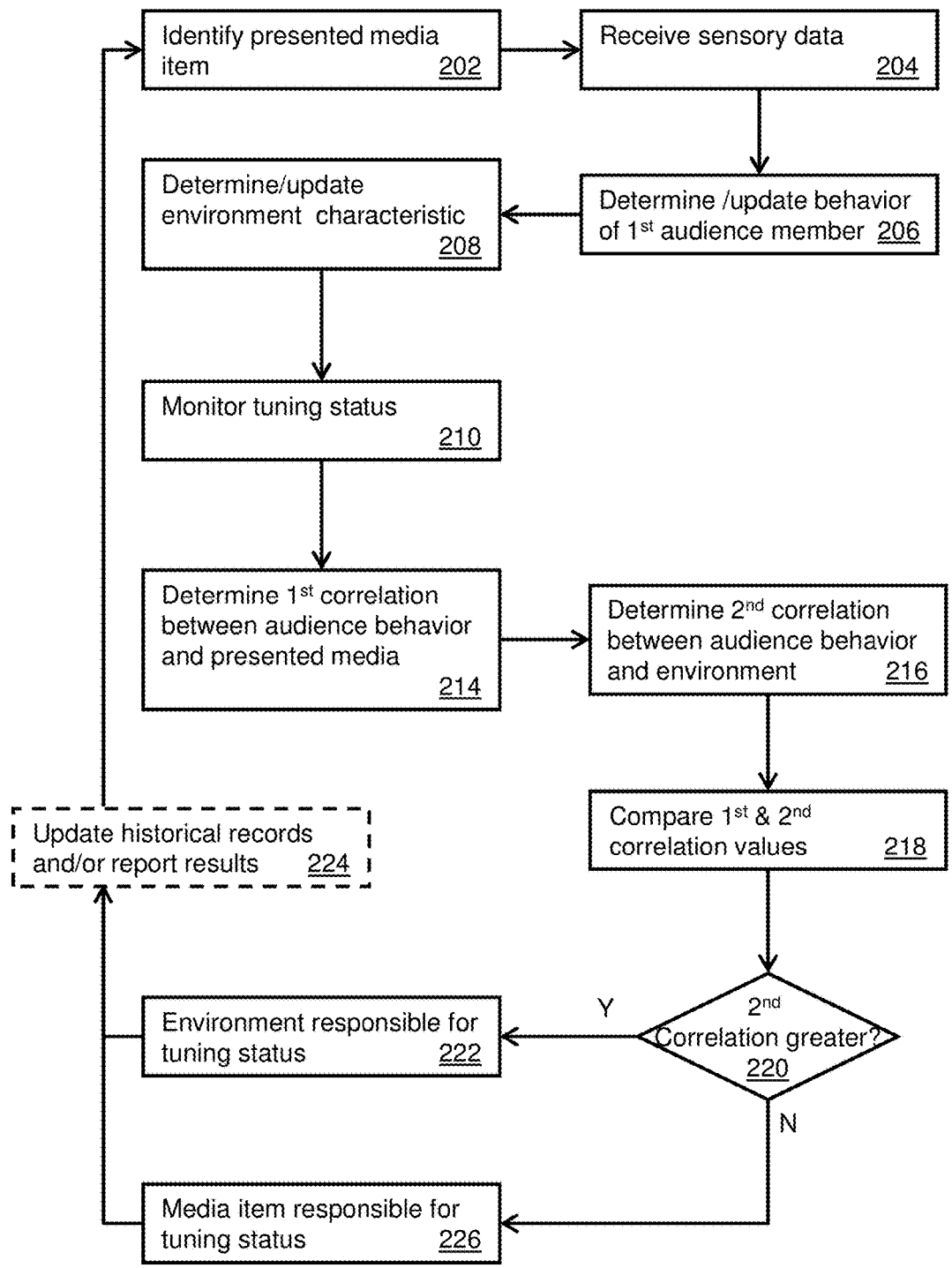
FIG. 2 depicts a flow diagram of an illustrative embodiment of a process used in portions of the system illustrated in FIG. 1.

FIG. 2 depicts a flow diagram of an illustrative embodiment of a process 200 for estimating or otherwise determining audience reaction, which can be used in portions of the system 100 described in FIG. 1. A media item is identified at 202. The media item can include a video program, audio content, images, video games, and so forth, which is presented at a display device 106 (FIG. 1). The media item can be identified, e.g., according to a tuning of a media processor, such as a set-top box 102. Namely, the set-top box 102 is tuned to a particular channel that presents the media item. The program can be identified according to various indicia such as the tuned channel, identification of the service provider, a time of day, calendar day, an electronic program guide, and so forth. Alternatively or in addition, the program can be identified according to metadata provided together with the program itself. As an example, the metadata can identify one or more of a program, a scene, a genre, actor(s), a producer, a director, a production studio, a media source, and the like.

Sensory data is received at 204. The sensory data can include data obtained from one or more sensors 114, 116, 118 proximate to the display device 106 alone or in combination with sensory data from other sources. Other sources might include electronic program guides, tuning information, news feeds, community electronic bulletin boards or web pages, and the like. The sensory data can include one or more of raw data from the sensors themselves or processed data, e.g., obtained from a sensor processor 120 in communications with the sensors 114, 116, 118. Accordingly, the sensory data can include more sophisticated sensory information, e.g., including combinations or fusion of data from more than one of the sensory sources, inferences, interpretations, e.g., dialog from speech, facial recognition, and/or emotional state from image data and so forth. At least some of the sensory date includes sensory data obtained from audience members proximal to the display device 106.

A behavior of an audience member is determined at 206. The behavior can be determined indirectly, e.g., according to the sensory data. Alternatively or in addition, the behavior can be self-reported by the audience member (e.g., according to responses to inquiries), by a user application, via social media usage, (e.g., tweets, postings) and so forth. Indirect determination of behavior can be obtained from an analysis of sensory information from one or more of the sensors. Sensory information relating to various characteristics of the audience member can include visual content (e.g., video and/or still images depicting the audience member), audio content (e.g., a microphone detecting noises of the audience member), and/or other sensory information, such as obtained from motion detectors, pressure sensors, temperature sensors, accelerometers, and/or biometric sensors.

Behavior information can include one or more of activity (e.g., animated or lethargic), noise (e.g., vocal or quiet), position or pose (e.g., seated, standing or reclining), and so forth. Behavior for any one of the audience members can be determined from sensory information of more than one audience member. Examples include, without limitation, interactions between audience members. Examples of behavior from joint monitoring might include bickering, e.g., between siblings, engaged conversations, intimate conversations, engaged dialog, and the like.

A characteristic of the environment is determined at 208. Sensory data related to the environment can include sensory data from the same sensors noted above. Namely, sensory information from the sensors 114, 116, 118 of the system 100, can be considered alone or in combination with information from any other sensory source, such as any of the sensors disclosed herein. A characteristic of the environment can include one or more indications of activity in the environment proximate to the display device 106. Indications of activity can include one or more of sounds, images, vibrations and the like. For example, an environmental characteristic can include a number (e.g., quantity) of audience members 110 proximate to the display device 106. Other environmental characteristics can include identities of the audience members, including general associations with particular demographics, e.g., age, gender, race, and/or determination of individual identities, e.g., names, obtained from self-identifications, facial recognitions, mannerisms, and the like.

The system 100 (FIG. 1) can include one or more interfaces for identifying or otherwise tagging a particular member of the audience, i.e., person, so as to more particularly identify a composition of the viewing audience. For example, the system can identify or otherwise distinguish individuals according to physical traits, such as outlook or sound. Thus, the system 100 can determine which face belongs to which household member. If an unexpected audience member is detected, such as a visiting friend, the system 100 can detect that it is not a regular household member, noting or otherwise identifying the unexpected audience member as a visitor. Upon subsequent visits, a friend identify can be established using similar techniques to those disclosed herein, e.g., to distinguish among friends.

Such identifications can use any of the techniques disclosed herein, including speaker identification, e.g., by which a speaker registers his/her voiceprint. Alternatively or in addition, a speaker identification can be derived from other sensory information, such as visual features, e.g., of a face and/or to identify who is talking. Still other identifying techniques include self-identification, e.g., according to a registration whether active or passive.

Tuning status is monitored at 210. For example, tuning status can be monitored to determine if and when an audience member tunes away from a particular media item presented at the display device 106, or whether the audience member remains fixed tuned to the particular media item. Tuning status can be monitored by any suitable means, including monitoring one or more of activity and/or status at the set-top box 102 and the remote control 112.

A first correlation is determined between the audience behavior and the presentation media at 214. The first correlation provides an indication or measure (e.g., a correlation value) that audience behavior relates to the presented media. By way of non-limiting example, behavior of one or more audience members can be compared to subject matter being presented at the display device 106. The subject matter being displayed can include indications, e.g., from metadata, of a scene change, completion of a program, transition to an informative message, such as an advertisement. A detected behavior occurring coincident, nearly coincident, or within some relatively short period of time of an event in the subject matter of the media content can provide evidence of a correlation between the behavior and the subject matter being displayed.

Examples of behavior may include moving, e.g., to get the remote control or to access a user interface on one of the set-top box or the display device 106. Other examples include vocalizations, e.g., "change the channel" animated behavior including one or more of motion and noise, etc. Apps such as AT&T's "EasyRemote" support controlling a television and/or set-top box from a smart phone or other device, with voice commands, such as "channel 122" or "Amazing Race." Thus, any reference to a remote control device as used herein can include, without limitation, reference to an app on another device, such as a smart phone. In some instances, media content can cause one or more somewhat predictable responses, e.g., channel surfing during a commercial break, or presentation of particularly alarming and/or offensive material, e.g., gory material presented during a movie, documentary or news program. Such material may cause an audience member to look away from the display device 106, to cover his or her eyes and/or ears, and so forth. To the extent such behaviors are observed through sensory data to occur close to events in the subject matter, a strong correlation exists between the audience behavior and the presented media. Likewise, behavior by which audience members remain focused on the presented media item, e.g., by maintaining a fixed gaze upon the display device 106, by remaining silent and/or by engaging in discussions related to the presented media item, by laughing coincident with a joke, etc., such behavior can also support a strong correlation between the audience behavior and the presented media. To the extent, however, that such behaviors are observed that are not coincident or close in time to any particular events in the subject matter, a relatively weak correlation exists between the audience behavior and the presented media.

At 216, a determination of a second correlation between behavior of an audience member and a characteristic of the environment is performed. The second correlation provides an indication or measure (e.g., a correlation value) that audience behavior relates to the environment other than the media content. By way of non-limiting example, behavior of one or more audience members can be compared to sensory information obtained from one or more of the sensors 114, 116, 118 and/or other environmental data. The environmental information might include information indicative of a change in audience members, e.g., a new audience member enters and/or a former audience member leaves. Such information can be obtained, e.g., from the cameras 114. A detected behavior occurring coincident, nearly coincident, or within some relatively short period of time of such an event, e.g., a few seconds to perhaps a minute or two, would support a correlation between the behavior and the environmental characteristic, e.g., audience member change. By way of example, a parent and child may together watch an educational program, such as a documentary. Upon a departure of the parent, the child may tune away from the educational program, e.g., to another program, such as a cartoon, or some other children's show. In this instance, the behavior of the audience member, e.g., retuning of the channel correlates to an environmental change, e.g., the parent leaving the room.

By way of further illustrative example, a first audience member may be watching a program until a second audience member, e.g., a sibling, enters. Evidence of discussion, and perhaps a quarrel can be observed, e.g., between siblings. The behavior, in terms of animations and/or vocalizations related to the quarrel, demonstrate an audience behavior that, in this instance, results from a change in the environment, e.g., entry of the sibling who may have wanted to watch a different program. In contrast, evidence of animated behavior and/or vocalizations suggesting a quarrel without a corresponding change in the environment would suggest that any correlation between the audience behavior and the environmental condition is relatively low.

Other examples of environmental characteristics that can cause or otherwise correlate to audience behavior includes a telephone call, door bell ringing, an in-person visitor, an alert, such as a weather warning, external events, such as sirens, thunder and lightning, regional social effects or local events, such as a major sporting event, and so forth. It is conceivable that during a major sporting event, an audience member might watch a program, while periodically tuning away from that program to monitor updates of the sporting event, without actually watching the sporting event. Thus, environmental inputs might include an electronic program guide, news feed, weather channel feed, etc.

The first and second correlation values can be compared at 218. In at least some embodiments, the correlation values are determined according to a common scale, e.g., 1 to 10 (e.g., 10 indicating a high correlation), or between 0.0 and 1.0 (e.g., 1 indicating a high correlation) or otherwise normalized to some common scale. Alternatively or in addition, one or another of the first and second correlation values can be assigned a weighting factor. By way of example, correlation between audience behavior and presented media can be given a greater weight, e.g., double that prescribed to the correlation between the audience behavior and the environment.

To the extent at 220 that the second correlation value is greater than the first correlation value (where a greater correlation value is indicative of higher correlation), a conclusion can be drawn at 222 that the tuning status, e.g., remaining fixed tuned or a tune away, was caused by the environment. Otherwise, in at least some embodiments, it can be concluded at 226 that the tuning status, e.g., remaining fixed tuned or a tune away was caused by the presented media.

Historical records can be updated and/or results reported at 224. In at least some embodiments, historical results can be considered alone or in combination with one or more of the first and second correlations. For example, a particular audience member might be prone to a particular behavior, e.g., a habitual tic, mannerism, or perhaps an allergy by which the audience member is prone to sneezing. Although such behaviors can be detected within sensory information, it would be possible knowing these effects to ignore or otherwise filter out such behaviors from the correlation process. Such filtering would tend to reduce the amount of processing, e.g., by the audience analyzer 130, while reducing the possibility of incorrectly attributing such behaviors to either the presented media or the environment.

By repeating the process with some regularity, sensory information can be gathered over a period of time that may or may not include a tune away event. Updates are determined for the behavior of the audience and environmental characteristics over time, such that an instantaneous state of the audience behavior and environmental characteristics are available upon detection of a tune away event. Alternatively or in addition, a historical perspective and/or statistical perspective can be obtained according to some number and/or duration of determinations of audience behavior and/or environmental characteristics. Additionally, historical records 224 may be recoded at regular intervals in response to the lack of tune aways. Specifically, while a tune away may represent a significant negative preference for a media item 202, the absence of these events may indicate a positive preference and can similarly be recorded 224 using behavior 206 and environment 208 characteristics.

In at least some embodiments, the measures or reasons as to why one or more audience members at the same or different households chose to remain fixed tuned and/or to tune away, can be collected and analyzed. The analysis can result in alternative content being presented or recommended to the individual audience members, e.g., during a video on demand or unicast presentation, and/or to a number of audience members. The alternatives in program content, including varied plots, different lineups, different jokes, actors, dialog, and so forth, can be determined and subsequently presented to the audience. A similar process 200 can be performed according to the subsequently presented material to determine effectiveness of the changes. For example, the content can be modified dynamically, or alternate versions of the content can be maintained and used in different geographic or demographic regions to maximize positive audience reaction.

It is understood that the content alternatives can include different commercial advertisements, different sequence of advertisement or rolls, different advertisers, and the like, referred to generally as dynamic optimized advertisement slotting. A behavioral adaptation can be measured, e.g., according to the process 200 to determine a behavioral adaptation of advertising rolls, or multiple sequences of advertising, optimized ad selection, and so forth. Substitution of advertising can occur virtually on the fly, to allow for determinations as to the effectiveness of the revised advertisements during the course of a single program or at least a single viewing, e.g., during the course of an evening, by the audience members.

Other analyses can be performed, e.g., to determine which demographic, e.g., children or adults, are more engaged or have a more positive emotional reaction to particular program content. Any of the analyses disclosed herein can be accomplished in real time, in near-real time, or at a later time, e.g., offline, after some collection period, such as a single primetime lineup, a week, or an entire season.

Figure 3:
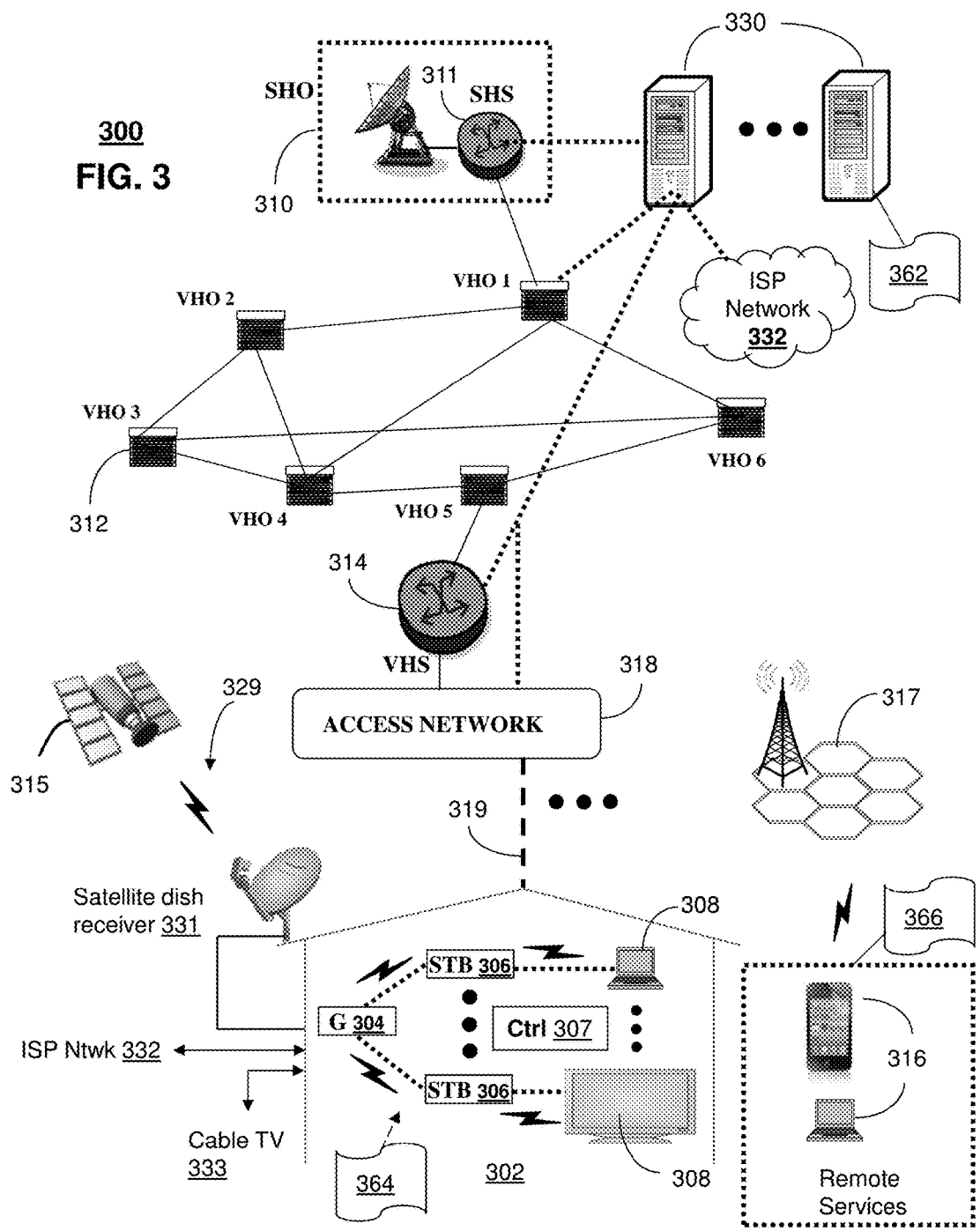
FIGS. 3-4 depict schematic diagrams of illustrative embodiments of communication systems that provide media services to systems, such as those illustrated in FIG. 1, and can evaluate usage of media processors and/or estimate audience reaction.

FIG. 3 depicts an illustrative embodiment of a first communication system 300 for delivering media content. The communication system 300 can represent an Internet Protocol Television (IPTV) media system. The communication system 300 can be overlaid or operably coupled with the system 100 (FIG. 1) for evaluating usage of a media processor and/or estimating audience reaction, as another representative embodiment of communication system 300. The system 300 can identify a first media item presented at a display, and from sensing data, can determine a behavior of an audience member and a characteristic of an environment in a vicinity of the display. The system 300 can monitor tuning status, e.g., by observing that a set-top box 306 remains tuned to a first media item, or program, or that the set-top box 306 has been tuned away from a first media item to a second media item. The system 300 can determine a first correlation value between the characteristic of the first audience member and subject matter being presented in the first media item, and can determine a second correlation value between the characteristic of the first audience member and the characteristic of the environment. Responsive to the second correlation value exceeding the first, the system 300 can determine that the environment and not the subject matter being presented in the first media item is responsible for the tuning status. Otherwise, responsive to the first correlation value exceeding the second, the system 300 can determine that the tune away is caused by the subject matter being presented in the first media item and not the environment.

The IPTV media system can include a super head-end office (SHO) 310 with at least one super headend office server (SHS) 311 which receives media content from satellite and/or terrestrial communication systems. In the present context, media content can represent, for example, audio content, moving image content such as 2D or 3D videos, video games, virtual reality content, still image content, and combinations thereof. The SHS server 311 can forward packets associated with the media content to one or more video head-end servers (VHS) 314 via a network of video head-end offices (VHO) 312 according to a multicast communication protocol.

The VHS 314 can distribute multimedia broadcast content via an access network 318 to commercial and/or residential buildings 302 housing a gateway 304 (such as a residential or commercial gateway). The access network 318 can represent a group of digital subscriber line access multiplexers (DSLAMs) located in a central office or a service area interface that provide broadband services over fiber optical links or copper twisted pairs 319 to buildings 302. The gateway 304 can use communication technology to distribute broadcast signals to media processors 306 such as Set-Top Boxes (STBs) which in turn present broadcast channels to media devices 308 such as computers or television sets managed in some instances by a media controller 307 (such as an infrared or RF remote controller).

The gateway 304, the media processors 306, and media devices 308 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 306 and subsystems of the IPTV media system for services such as video-on-demand (VoD), browsing an electronic programming guide (EPG), or other infrastructure services.

A satellite broadcast television system 329 can be used in the media system of FIG. 3. The satellite broadcast television system can be overlaid, operably coupled with, or replace the IPTV system as another representative embodiment of communication system 300. In this embodiment, signals transmitted by a satellite 315 that include media content can be received by a satellite dish receiver 331 coupled to the building 302. Modulated signals received by the satellite dish receiver 331 can be transferred to the media processors 306 for demodulating, decoding, encoding, and/or distributing broadcast channels to the media devices 308. The media processors 306 can be equipped with a broadband port to an Internet Service Provider (ISP) network 332 to enable interactive services such as VoD and EPG as described above.

In yet another embodiment, an analog or digital cable broadcast distribution system such as cable TV system 333 can be overlaid, operably coupled with, or replace the IPTV system and/or the satellite TV system as another representative embodiment of communication system 300. In this embodiment, the cable TV system 333 can also provide Internet, telephony, and interactive media services.

The subject disclosure can apply to other present or next generation over-the-air and/or landline media content services system.

Some of the network elements of the IPTV media system can be coupled to one or more computing devices 330, a portion of which can operate as a web server for providing web portal services over the ISP network 332 to wireline media devices 308 or wireless communication devices 316.

Communication system 300 can also provide for all or a portion of the computing devices 330 to function as a viewer analyzer for analyzing one or more of audiences, viewing environments and/or other information sources (herein referred to as an viewer analyzer 330). The viewer analyzer 330 can use computing and communication technology to perform function 362, which can include among other things, monitoring tuning status, e.g., to determine a fixed tune, tune away events, evaluating sensory information related to viewers and/or a viewing environment associated with the tune away event and in at least some instances determining or otherwise estimating a causal relationship between any of the sensory and environmental information and the tune away event. In at least some embodiments, the media processors 306 and wireless communication devices 316 can be provisioned with software functions 364 and 366, respectively, to utilize the services of the viewer analyzer 330. These software functions 364, 366 can include, for example, capturing or otherwise obtaining sensory data (e.g., from sensor devices such as cameras, audio recorders, and so forth), reporting functions to report tune away events, functions to evaluate and/or report usage before, during and/or after tune away events, applications supporting entry and update of user profiles, privacy elections, and so forth.

Multiple forms of media services can be offered to media devices over landline technologies such as those described above. Additionally, media services can be offered to media devices by way of a wireless access base station 317 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 4:
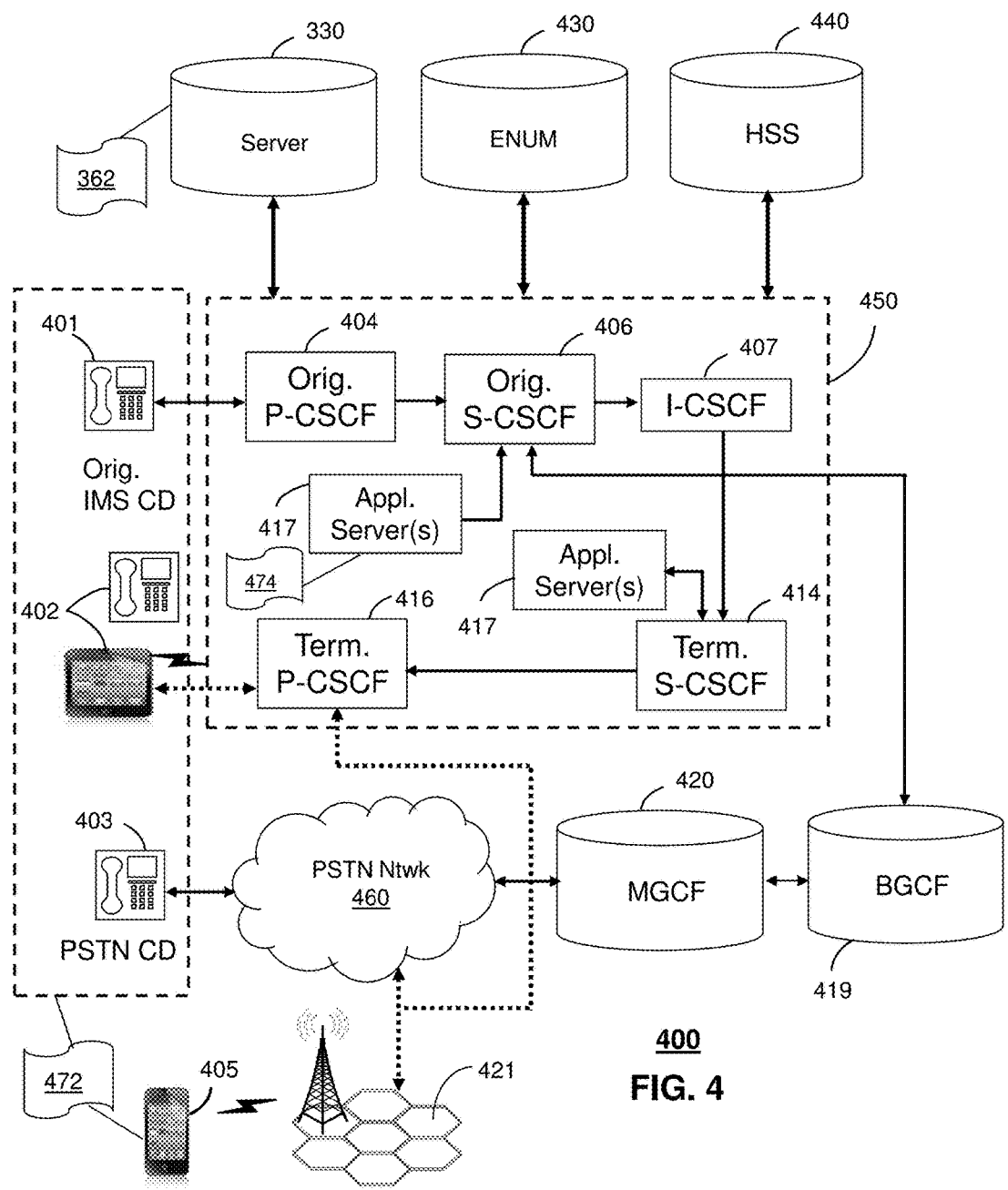

FIG. 4 depicts an illustrative embodiment of a communication system 400 employing an IP Multimedia Subsystem (IMS) network architecture to facilitate the combined services of circuit-switched and packet-switched systems. Communication system 400 can be overlaid or operably coupled with the system 100 (FIG. 1) for evaluating usage of a media processor and communication system 300 (FIG. 3) and/or estimating audience reaction, as another representative embodiment of communication system 400. The system 400 can identify a first media item presented at a display, and from sensing data, a behavior of an audience member and a characteristic of an environment in a vicinity of the display. The system 400 can monitor tuning status, e.g., by observing that a media processor remains tuned to a first media item, or that the media processor has been tuned away by which the media processor is tuned to a second media item. The system 400 can determine a first correlation value between the characteristic of the first audience member and subject matter being presented in the first media item, and can determine a second correlation value between the characteristic of the first audience member and the characteristic of the environment. Responsive to the second correlation value exceeding the first, the system 400 can determine that the tune away is caused by the environment and not the subject matter being presented in the first media item. Responsive to the first correlation value exceeding the second, the system 400 can determine that the tune away is caused by the subject matter being presented in the first media item and not the environment.

Communication system 400 can comprise a Home Subscriber Server (HSS) 440, a tElephone NUmber Mapping (ENUM) server 430, and other network elements of an IMS network 450. The IMS network 450 can establish communications between IMS-compliant communication devices (CDs) 401, 402, Public Switched Telephone Network (PSTN) CDs 403, 405, and combinations thereof by way of a Media Gateway Control Function (MGCF) 420 coupled to a PSTN network 460. The MGCF 420 need not be used when a communication session involves IMS CD to IMS CD communications. A communication session involving at least one PSTN CD may utilize the MGCF 420.

IMS CDs 401, 402 can register with the IMS network 450 by contacting a Proxy Call Session Control Function (P-CSCF) which communicates with an interrogating CSCF (I-CSCF), which in turn, communicates with a Serving CSCF (S-CSCF) to register the CDs with the HSS 440. To initiate a communication session between CDs, an originating IMS CD 401 can submit a Session Initiation Protocol (SIP INVITE) message to an originating P-CSCF 404 which communicates with a corresponding originating S-CSCF 406. The originating S-CSCF 406 can submit the SIP INVITE message to one or more application servers (ASs) 417 that can provide a variety of services to IMS subscribers.

For example, the application servers 417 can be used to perform originating call feature treatment functions on the calling party number received by the originating S-CSCF 406 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 406 can submit queries to the ENUM system 430 to translate an E.164 telephone number in the SIP INVITE message to a SIP Uniform Resource Identifier (URI) if the terminating communication device is IMS-compliant. The SIP URI can be used by an Interrogating CSCF (I-CSCF) 407 to submit a query to the HSS 440 to identify a terminating S-CSCF 414 associated with a terminating IMS CD, such as CD 402. Once identified, the I-CSCF 407 can submit the SIP INVITE message to the terminating S-CSCF 414. The terminating S-CSCF 414 can then identify a terminating P-CSCF 416 associated with the terminating CD 402. The P-CSCF 416 may then signal the CD 402 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 4 may be interchangeable. It is further noted that communication system 400 can be adapted to support video conferencing. In addition, communication system 400 can be adapted to provide the IMS CDs 401, 402 with the multimedia and Internet services of communication system 300 of FIG. 3.

If the terminating communication device is instead a PSTN CD such as CD 403 or CD 405 (in instances where the cellular phone only supports circuit-switched voice communications), the ENUM system 430 can respond with an unsuccessful address resolution which can cause the originating S-CSCF 406 to forward the call to the MGCF 420 via a Breakout Gateway Control Function (BGCF) 419. The MGCF 420 can then initiate the call to the terminating PSTN CD over the PSTN network 460 to enable the calling and called parties to engage in voice and/or data communications.

It is further appreciated that the CDs of FIG. 4 can operate as wireline or wireless devices. For example, the CDs of FIG. 4 can be communicatively coupled to a cellular base station 421, a femtocell, a WiFi router, a Digital Enhanced Cordless Telecommunications (DECT) base unit, or another suitable wireless access unit to establish communications with the IMS network 450 of FIG. 4. The cellular access base station 421 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 4.

Cellular phones supporting LTE can support packet-switched voice and packet-switched data communications and thus may operate as IMS-compliant mobile devices. In this embodiment, the cellular base station 421 may communicate directly with the IMS network 450 as shown by the arrow connecting the cellular base station 421 and the P-CSCF 416.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The viewer analyzer 330 of FIG. 3 can be operably coupled to the second communication system 400 for purposes similar to those described above. The viewer analyzer 330 can perform function 362 and thereby provide services to the CDs 401, 402, 403 and 405 of FIG. 4 related to monitoring of tuning status, evaluation of sensory information related to viewers and/or a viewing environment associated with the tune away event and in at least some instances determination or otherwise estimation of a causal relationship between any of the sensory and environmental information and the tune away event. The CDs 401, 402, 403 and 405, which can be adapted with software to perform function 472 to utilize the services of the viewer analyzer 330. The viewer analyzer 330 can be an integral part of the application server(s) 417 performing function 472, which can be substantially similar to function 362 and adapted to the operations of the IMS network 450.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 5:
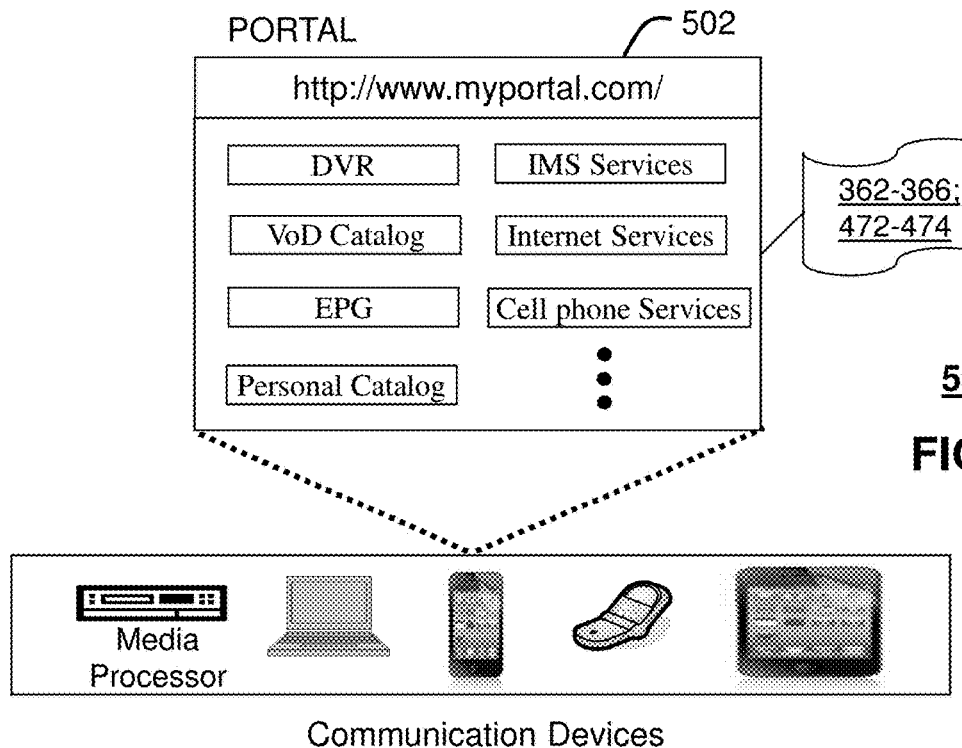
FIG. 5 depicts an illustrative embodiment of a web portal for interacting with communication systems, such as those illustrated in FIGS. 4-5 and systems, such as those illustrated in FIG. 1.

FIG. 5 depicts an illustrative embodiment of a web portal 502 which can be hosted by server applications operating from the computing devices 330 of the communication system 100 illustrated in FIG. 1. The communication system 500 can be overlaid or operably coupled with the system 100 (FIG. 1) for evaluating usage of a media processor, the communication system 300, and/or the communication system 400 as another representative embodiment of a system 100 for evaluating usage of a media processor, a communication system 300, and/or a communication system 400.

The system 500 can identify a first media item presented at a display, and from sensing data, a behavior of an audience member and a characteristic of an environment in a vicinity of the display. The system 500 can monitor tuning status, e.g., by observing that a media processor remains tuned to a first media program or that the media processor has been tuned away by which the media processor is tuned to a second media item. The system 500 can determine a first correlation value between the characteristic of the first audience member and subject matter being presented in the first media item, and a second correlation value between the characteristic of the first audience member and the characteristic of the environment. Responsive to the second correlation value exceeding the first, the system 500 can determine that the tune away is caused by the environment and not the subject matter being presented in the first media item.

The web portal 502 can be used for managing services of communication systems 300-400. A web page of the web portal 502 can be accessed by a Uniform Resource Locator (URL) with an Internet browser such as Microsoft's Internet Explorer™, Mozilla's Firefox™, Apple's Safari™, or Google's Chrome™ using an Internet-capable communication device such as those described in FIG. 1. The web portal 502 can be configured, for example, to access a media processor 306 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 306. The web portal 502 can also be used for provisioning IMS services described earlier, provisioning Internet services, provisioning cellular phone services, and so on.

The web portal 502 can further be utilized to manage and provision software applications 362-366, and 472-476 to adapt these applications as may be desired by subscribers and/or service providers of the system 100 for evaluating usage of a media processor (FIG. 1), and the communication systems 300-400 (FIGS. 4-5).

Figure 6:
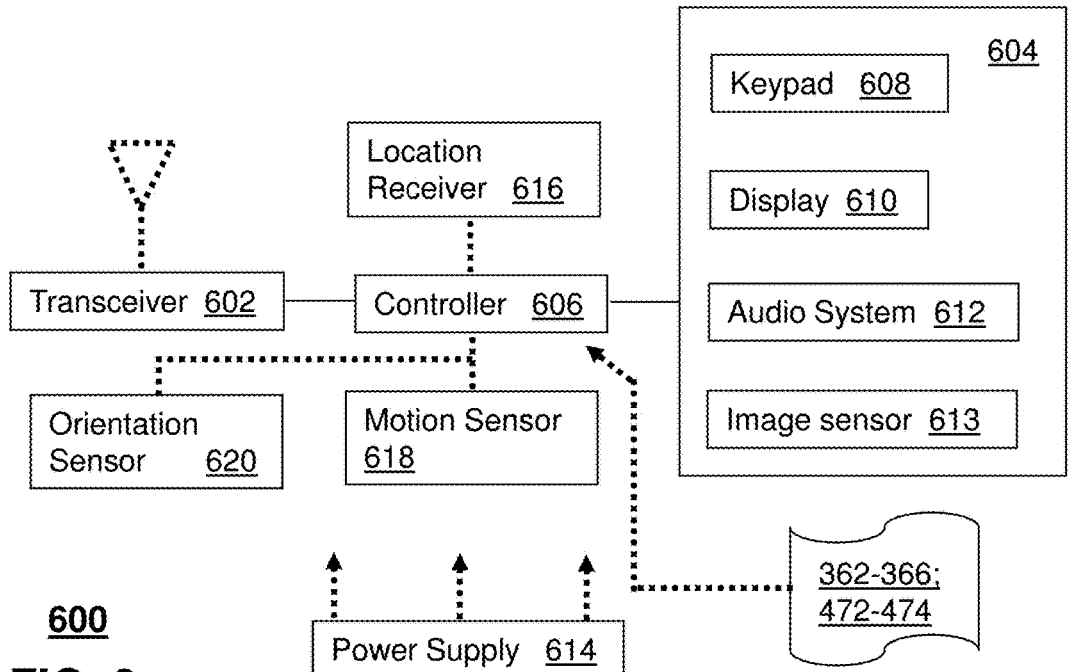
FIG. 6 depicts an illustrative embodiment of a communication device that can be used in the systems and methods of FIGS. 1-5, as well as in evaluating usage of media processors and/or estimating audience reaction.

FIG. 6 depicts an illustrative embodiment of a communication device 600. Communication device 600 can serve in whole or in part as an illustrative embodiment of the devices depicted in the system 100 of FIG. 1, and the systems 300, 400 of FIGS. 3-4. The communication device 600 can identify a first media item presented at a display, and from sensing data, a behavior of an audience member and a characteristic of an environment in a vicinity of the display. The communication device 600 can monitor tuning status, e.g., by observing that a media processor remains tuned to a first media item, or program, or that the media processor has been tuned away by which the media processor is tuned to a second media item. The communication device 600 can determine a first correlation value between the characteristic of the first audience member and subject matter being presented in the first media item, and can determine a second correlation value between the characteristic of the first audience member and the characteristic of the environment. Responsive to the second correlation value exceeding the first, the communication device 600 can determine that the tune away is caused by the environment and not the subject matter being presented in the first media item. Responsive to the first correlation value exceeding the second, the communication device 600 can determine that the tune away is caused by the subject matter being presented in the first media item and not the environment.

To enable these features, the communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 300.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the media processor 306, the media devices 308, or the portable communication devices 316 of FIG. 3, as well as the IMS CDs 401-402 and PSTN CDs 403-405 of FIG. 4. It will be appreciated that the communication device 600 can also represent other devices that can operate in communication systems 300-400 of FIGS. 3-4 such as a gaming console and a media player.

The communication device 600 shown in FIG. 6 or portions thereof can serve as a representation of one or more of the devices of the system 100 evaluating usage of a media processor (FIG. 1), the communication system 300 (FIG. 3), and the communication system 400 (FIG. 4). In addition, the controller 606 can be adapted in various embodiments to perform the functions 362-366 and 472-476, respectively.

Upon reviewing the aforementioned embodiments, it would be evident to an artisan with ordinary skill in the art that said embodiments can be modified, reduced, or enhanced without departing from the scope of the claims described below. For example, the illustrative examples provided herein relate to presentation of broadcast, e.g., multicast, media content and to the presentation of video-on-demand, e.g., unicast, media content. It is understood that similar techniques can be applied to evaluation of audience reaction related to viewing of time-shifted media content, e.g., presented by a digital video recorder. When viewing pre-recorded media content items, tune away events can include, without limitation, fast forward events, rewind events, pauses or stop events encountered during presentation, e.g., playback. It is also understood that tune away events can include selection of other pre-recorded media content and/or switching to other media content items, e.g., broadcast and/or video on demand items. Other embodiments can be used in the subject disclosure.

In one or more embodiments, the tune aways can be other than a changing of a channel. For example, the tune away can be initiating of a Picture-in-Picture format, a split screen format, or some other television display format that introduces another media content item for presentation at the display (with or without the first media content item being displayed).

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
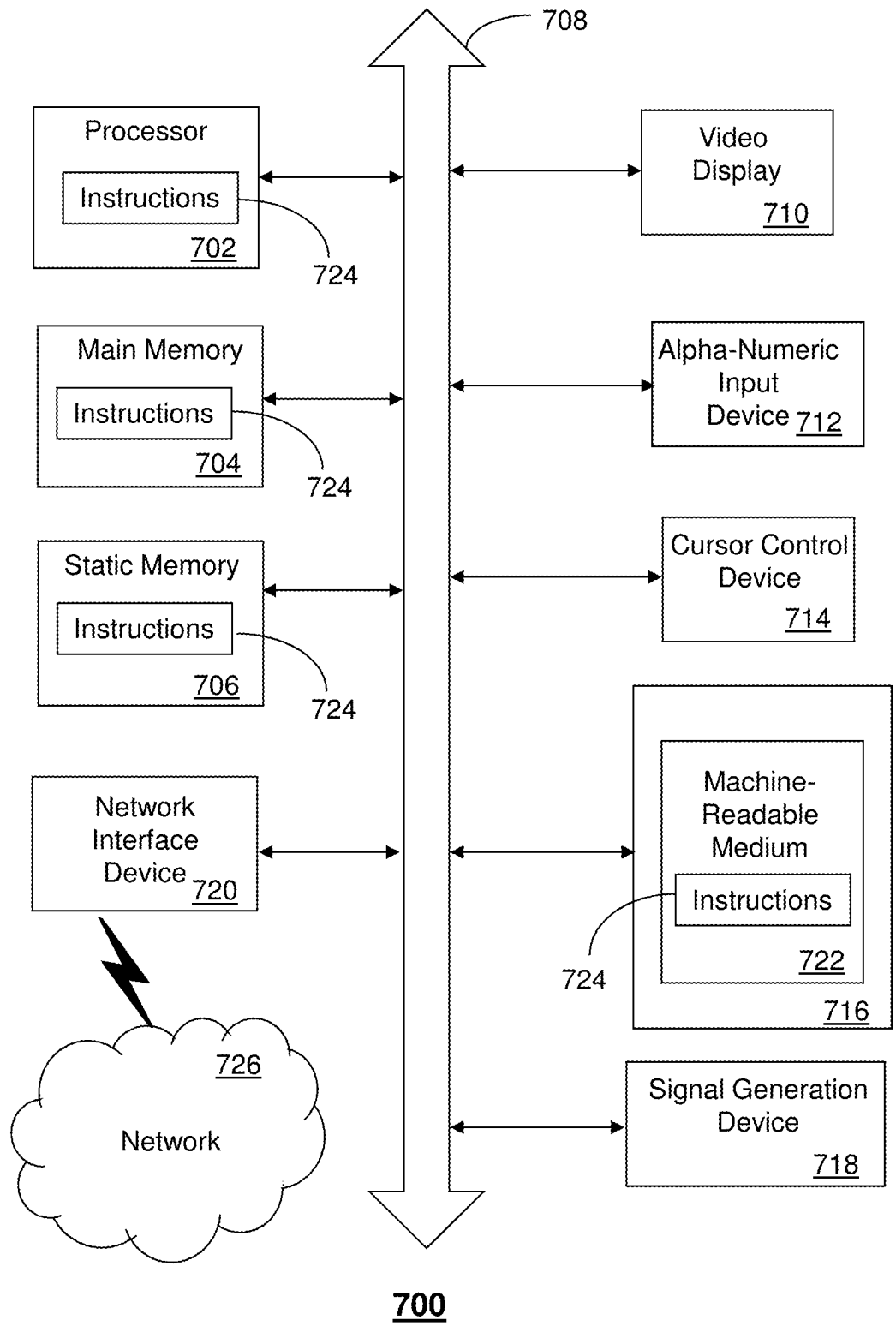
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the viewer analyzer 130, 330, the media processor 102, 306, the sensor processor 120, the remote control 112 and other devices of FIG. 1 and FIGS. 3-6. In some embodiments, the machine may be connected (e.g., using a network 726) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display. The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., wireless personal area networks, such as Bluetooth® networks, wireless local area networks, such as WI-FI networks, and low-power wireless networks, such as ZigBee® networks), and long-range communications (e.g., WiMAX, GSM, CDMA, LTE) can be used by computer system 700.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations," this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
    monitoring, by a processing system comprising a processor, a tuning status comprising one of a fixed tune by which a media processor remains tuned to a first channel that provides a first media item, or a tune away by which the media processor is tuned from the first channel to a second channel that provides a second media item, wherein a subject matter presented at a display coupled to the media processor is based on the tuning status;
    determining, by the processing system, a first correlation value between a characteristic of a first audience member and the subject matter presented at the display, wherein the characteristic is based on first sensory data obtained from a first environmental sensor of a plurality of environmental sensors in a vicinity of the display, and wherein the subject matter presented at the display is observable by the first audience member;
    determining, by the processing system, a second correlation value between the characteristic of the first audience member and a characteristic of an environment in a vicinity of the first audience member, wherein the characteristic of the environment is based on second sensory data obtained from a second environmental sensor of the plurality of environmental sensors;
    responsive to the second correlation value exceeding the first correlation value, determining, by the processing system, that the tune away is likely, based on the characteristic of the environment more so than the subject matter presented at the display; and
    determining, by the processing system, alternative content to be presented or recommended to the first audience member.

2. The method of claim 1, further comprising:
    responsive to the first correlation value exceeding the second correlation value, determining, by the processing system, that the tune away is likely, based on the subject matter presented at the display providing the first media item and not the environment.

3. The method of claim 2, further comprising: determining, by the processing system, alternative content to be presented or recommended to the first audience member, based on the subject matter presented at the display.

4. The method of claim 1, wherein the alternative content is determined, based on varied plots, different lineups, different jokes, different actors, different dialog, or a combination thereof.

5. The method of claim 1, further comprising:
    presenting, by the processing system, the alternative content to a second audience member, wherein subject matter of the alternative content is presented at a second display that is observable by the second audience member;
    recording, by the processing system, a third correlation value between a behavior of the second audience member and subject matter provided by a second media processor tuned to a third channel, wherein the subject matter of the alternative content is presented at a second display that is observable by the second audience member, and wherein the behavior is based on third sensory data obtained from a third environmental sensor of a plurality of environmental sensors in a vicinity of the second display;
    recording, by the processing system, a fourth correlation value between the behavior of the second audience member and a second characteristic of a second environment in a vicinity of the second display wherein the characteristic of the second environment is based on fourth sensory data obtained from a fourth environmental sensor of the plurality of environmental sensors in the vicinity of the second display; and
    determining, by the processing system, an effectiveness of presenting the alternative content by determining an unlikelihood that a tune away, by which the second media processor is tuned from the third channel to a fourth channel that provides another media item, may occur, based on the second characteristic of the second environment, the subject matter presented at the second display, the third correlation value, or the fourth correlation value.

6. The method of claim 5, wherein the second audience member is in a different geographic region from the first audience member.

7. The method of claim 6, wherein the alternative content is determined based at least in part on the different geographic region of the second audience member.

8. The method of claim 5, wherein the second audience member is in a different demographic area than the first audience member.

9. The method of claim 8, wherein the alternative content is determined based at least in part on the different demographic area of the second audience member.

10. The method of claim 1, wherein the alternative content comprises different commercial advertisements, different sequences of advertisement or rolls, different advertisers, or a combination thereof.

11. The method of claim 10, further comprising: measuring a behavioral adaptation, based on a presentation of the alternative content.

12. The method of claim 1, further comprising:
determining, by the processing system, that the tune away would likely occur coincident with an advertisement presented; and
associating, by the processing system, a gender, an age, an attribute estimator, or a combination thereof with the first audience member.

13. A system, comprising:
a processing system including a processor; and
a memory that stores executable instructions that, when executed by the processing system, facilitate performance of operations, comprising:
monitoring a tuning status comprising one of a fixed tune by which a media processor remains tuned to a first channel that provides a first media item, or a tune away by which the media processor is tuned from the first channel to a second channel that provides a second media item, wherein a subject matter presented at a display coupled to the media processor is based on the tuning status;
determining a first correlation value between a characteristic of a first audience member and the subject matter presented at the display, wherein the characteristic is based on first sensory data obtained from a first environmental sensor of a plurality of environmental sensors in a vicinity of the display, and wherein the subject matter presented at the display is observable by the first audience member;
determining a second correlation value between the characteristic of the first audience member and a characteristic of an environment in a vicinity of the first audience member, wherein the characteristic of the environment is based on second sensory data obtained from a second environmental sensor of the plurality of environmental sensors;
responsive to the second correlation value exceeding the first correlation value, determining that the tune away is likely, based on the characteristic of the environment more so than the subject matter presented at the display; and
determining alternative content to be presented or recommended to the first audience member.

14. The system of claim 13, wherein the processing system comprises a plurality of processors operating in a distributed processing environment and the operations further comprise: responsive to the second correlation value exceeding the first correlation value, determining that the tune away is likely, based on the subject matter presented at the display presenting the first media item and not the environment.

15. The system of claim 13, further comprising:
receiving the second sensory data obtained from the second environment sensor of the plurality of environmental sensors; and
detecting from the second sensory data, a reaction of the first audience member that is associated with the environment and not associated with the subject matter being presented in the first media item.

16. The system of claim 13, wherein the operations further comprise:
determining from sensory data obtained from an environmental sensor of the plurality of environmental sensors, a characteristic of a second audience member proximate to the display, wherein a first media item presented at the display is observable by the second audience member;
determining a third correlation value between the characteristic of the first audience member and the characteristic of the second audience member; and
responsive to the third correlation value exceeding the first and second correlation values, determining that the tune away is likely, based on the second audience member more so than the subject matter presented in the first media item or the environment.

17. The system of claim 16, wherein the operations further comprise determining from the sensory data, which of the first audience member and the second audience member is responsible for a present channel selection.

18. A machine-readable storage device, comprising executable instructions that, responsive to being executed by a processing system including a processor, facilitate performance of operations comprising:
monitoring a tuning status comprising one of a fixed tune by which a media processor remains tuned to a first channel that provides a first media item, or a tune away by which the media processor is tuned from the first channel to a second channel that provides a second media item, wherein a subject matter presented at a display coupled to the media processor is based on the tuning status;
determining a first correlation value between a characteristic of a first audience member and the subject matter presented at the display, wherein the characteristic is based on first sensing data obtained from a first environmental sensor of a plurality of environmental sensors in a vicinity of the display, and wherein the subject matter presented at the display is observable by the first audience member;
determining a second correlation value between the characteristic of the first audience member and a characteristic of an environment in a vicinity of the first audience member, wherein the characteristic of the environment is based on second sensing data obtained from a second environmental sensor of the plurality of environmental sensors;
responsive to the second correlation value exceeding the first correlation value, determining that the tune away is likely, based on the characteristic of the environment more so than the subject matter presented at the display; and
determining alternative content to be presented or recommended to the first audience member.

19. The machine-readable storage device of claim 18, wherein the processor comprises a plurality of processors operating in a distributed processing environment and the operations further comprise, responsive to the first correlation value exceeding the second correlation value, determining that the tune away is likely, based on the subject matter presented at the display more so than the environment.

20. The machine-readable storage device of claim 19, wherein the determining that the tune away is likely, based on the characteristic of the environment, further comprises:
   accessing the second sensing data; and
   detecting from the second sensing data a reaction of one of the first audience member, a second audience member, or both, that is associated with the environment and not associated with the subject matter in the first media item, thereby resulting in the second correlation value exceeding the first correlation value.

\* \* \* \* \*